US012604130B2

(12) United States Patent
Kim et al.

(10) Patent No.: US 12,604,130 B2
(45) Date of Patent: Apr. 14, 2026

(54) HEARING DEVICE WITH A BLEEDING CIRCUIT FOR DELIVERING MESSAGES TO A CHARGING DEVICE

(71) Applicant: Sonova AG, Stäfa (CH)

(72) Inventors: Jaewoo Kim, Waterloo (CA); Aistis Januszko, Kitchener (CA); Isaac Hamp, Kitchener (CA)

(73) Assignee: Sonova AG, Stäfa (CH)

( * ) Notice: Subject to any disclaimer, the term of this patent is extended or adjusted under 35 U.S.C. 154(b) by 278 days.

(21) Appl. No.: 18/400,585

(22) Filed: Dec. 29, 2023

(65) Prior Publication Data

US 2025/0220331 A1     Jul. 3, 2025

(51) Int. Cl.
| | |
|---|---|
| H04R 1/1025 | (2026.01) |
| G08B 3/10 | (2006.01) |
| H02J 7/42 | (2026.01) |
| H02J 7/60 | (2026.01) |
| H02J 7/80 | (2026.01) |

(52) U.S. Cl.
CPC ............. H04R 1/1025 (2013.01); G08B 3/10 (2013.01); H02J 7/42 (2026.01); H02J 7/663 (2026.01); H02J 7/80 (2026.01)

(58) Field of Classification Search
CPC .. H04R 1/1025; H02J 7/00034; H02J 7/0031; H02J 7/0047; G08B 3/10
See application file for complete search history.

(56) References Cited

U.S. PATENT DOCUMENTS

| | | | | |
|---|---|---|---|---|
| 10,575,106 | B1 * | 2/2020 | Bergmann | H04R 25/505 |
| 2014/0176084 | A1 * | 6/2014 | Geantil | H02J 7/0047 |
| | | | | 320/152 |

| | | | | |
|---|---|---|---|---|
| 2015/0326982 | A1 | 11/2015 | Sudan | |
| 2017/0303051 | A1 * | 10/2017 | Högberg | H02J 7/007 |
| 2018/0123355 | A1 | 5/2018 | Olson et al. | |
| 2018/0332408 | A1 * | 11/2018 | Frei | H02J 7/0071 |
| 2019/0052979 | A1 * | 2/2019 | Chen | H04R 1/1025 |
| 2020/0120428 | A1 * | 4/2020 | Gehring | H04R 25/554 |
| 2021/0306773 | A1 * | 9/2021 | Kvist | H01Q 1/48 |
| 2022/0272461 | A1 * | 8/2022 | Bisgaard | H02J 50/10 |
| 2022/0322016 | A1 * | 10/2022 | Dickmann | H04R 25/558 |
| 2022/0394401 | A1 * | 12/2022 | Nielsen | H04R 25/602 |
| 2023/0010213 | A1 * | 1/2023 | Roth | G01R 31/371 |
| 2023/0209238 | A1 * | 6/2023 | Klemmensen | H04R 25/30 |
| | | | | 320/108 |
| 2025/0039593 | A1 * | 1/2025 | Narampanawe | H04R 25/00 |

FOREIGN PATENT DOCUMENTS

| | | | | |
|---|---|---|---|---|
| EP | 4489430 | A1 * | 1/2025 | H04R 1/1025 |

OTHER PUBLICATIONS

European Search Report for Application 24218525, dated May 22, 2025, 7 pgs., European Patent Office, Germany.

* cited by examiner

*Primary Examiner* — Olisa Anwah

(74) *Attorney, Agent, or Firm* — McDonald Hopkins LLC

(57)     ABSTRACT

A system of a hearing device and a charging device that sends a message via electrical pulses from a bleeding circuit to the hearing device. The electrical pulses may communicate information about a battery state of charge or the presence of a fault in the charging of the hearing device. The charging device may, based on the hearing device message, perform at least one of changing a parameter of the electrical power, presenting a visual indication by a visual indicator on the charging device, or producing an acoustic signal.

17 Claims, 7 Drawing Sheets

HEARING DEVICE WITH A BLEEDING CIRCUIT FOR DELIVERING MESSAGES TO A CHARGING DEVICE

BACKGROUND

Modern hearing devices are electronic instruments worn in or around the ear canal that compensate for hearing loss or hearing impairment by receiving, amplifying, and reproducing sound waves. These hearing devices are often powered by portable rechargeable batteries, which can be housed within the hearing device itself. The device for charging these batteries is often an external charger that has processing capabilities to adjust the amount of current being delivered to the batteries powering the hearing device. Further, these chargers often contain communication hardware to receive status messages from the hearing device, such as the battery level or a notification that a fault has occurred. Separate communication hardware used to exchange messages, however, adds additional manufacturing expense, weight, size, and the like to the charging device and are thus not optimal for enabling communication between a battery of a hearing device and a charger.

BRIEF SUMMARY

According to one example of the present disclosure, a system for charging a hearing device comprises a hearing device comprising a battery, a charging management circuit for charging the battery, and a bleeding circuit in parallel with the charging circuit; and a charging device configured to provide electrical power to the hearing device, wherein the charging circuit is further configured to generate a charging current from the electrical power, wherein the bleeding circuit is configured to generate bleeding current pulses from the electrical power, wherein the charging device comprises a current monitor configured to detect the bleeding current pulses and to interpret the bleeding current pulses as a hearing device message.

In various embodiments of the above example, based on the hearing device message, the charging device is configured to perform at least one of changing a parameter of the electrical power, presenting a visual indication by a visual indicator on the charging device, and producing an acoustic signal; the electrical power is provided as a voltage and the charging device and the hearing device are galvanically connected; the electrical power is provided as an alternating electromagnetic field, the hearing device comprises a coil to transform the alternating electromagnetic field to an alternating voltage and a rectifier to transform the alternating voltage into a direct voltage, and wherein the charging circuit is configured to generate the charging current from the direct voltage and the bleeding circuit is configured to generate the bleeding current pulses from the direct voltage; the hearing device message comprises at least one of a state of charge of the battery, a status of the charging circuit and a fault condition; the charging device is configured to stop providing electrical power to the hearing device when the hearing device message indicates that a fault has occurred; the bleeding circuit comprises a switch that toggles a bleeder resistor on and off; the charging device interprets the hearing device message based on current values of the bleeding current pulses; the charging device interprets the hearing device message based on a frequency or a count of the bleeding current pulses detected over a period of time; the charging management circuit is configured to switch between a constant-current charging mode and constant-voltage charging mode; the bleeder resistor is connected to a voltage output regulator; the switch of the bleeding circuit is controlled by activation and deactivation of a current sink; and the switch of the bleeding circuit is a transistor.

According to another example of the present disclosure, a method comprises providing electrical power from a charging device to a charging management circuit for charging the battery and a bleeding circuit connected in parallel with the charging management circuit; the charging management circuit generating a charging current from the electrical power; the bleeding circuit generating bleeding current pulses from the electrical power; detecting the bleeding current pulses; and interpreting the bleeding current pulses. Optionally, based on the hearing device message, the method includes performing at least one of changing a parameter of the electrical power, presenting a visual indication by a visual indicator on the charging device, or producing an acoustic signal. In various embodiments of the above example, the method further comprises stopping the charging of the hearing device if the detected electrical pulses indicate that a fault has occurred; and the bleeding circuit comprises a resistor in series with a switch and operating the bleeding circuit includes operating the switch to control a current through the resistor to send the electrical pulses.

According to another example, a hearing device comprises a charging management circuit configured to receive electrical power from a charging device; and a bleeding circuit in parallel with the charging management circuit and configured to receive the electrical power from the charging device, wherein the charging management circuit is configured to generate a charging current from the electrical power to charge a battery of the hearing device, wherein the bleeding circuit is configured to generate bleeding current pulses from the electrical power and send the bleeding current pulses to a current monitor of the charging device configured to detect the bleeding current pulses and to interpret the bleeding current pulses as a hearing device message.

BRIEF DESCRIPTIONS OF THE SEVERAL VIEWS OF THE DRAWINGS

DETAILED DESCRIPTIONS OF THE DRAWINGS

Considering the above, there is a need for a charging circuit design that allows for a hearing device to communicate a battery status to a charger without adding extra communication hardware. Accordingly, communication between a hearing device and a charger can instead be implemented through a bleeding circuit tied to a charging path. A bleeding circuit typically contains a bleeder resistor, which is disposed in parallel with a charging capacitor and enables a discharge path to be established, and a switch to toggle the bleeding circuit on and off. Thus, excess voltage is gradually and safely discharged away from the charging capacitor. It follows that in some applications, the voltage pulses that are discharged from the bleeding circuit can be measured. When a charger is equipped with processing capabilities to detect and interpret these electrical pulses, they can be interpreted as messages that communicate a status of the battery of a hearing device. Thus, the need for additional communication hardware in the hearing device can be eliminated.

Figure 1:
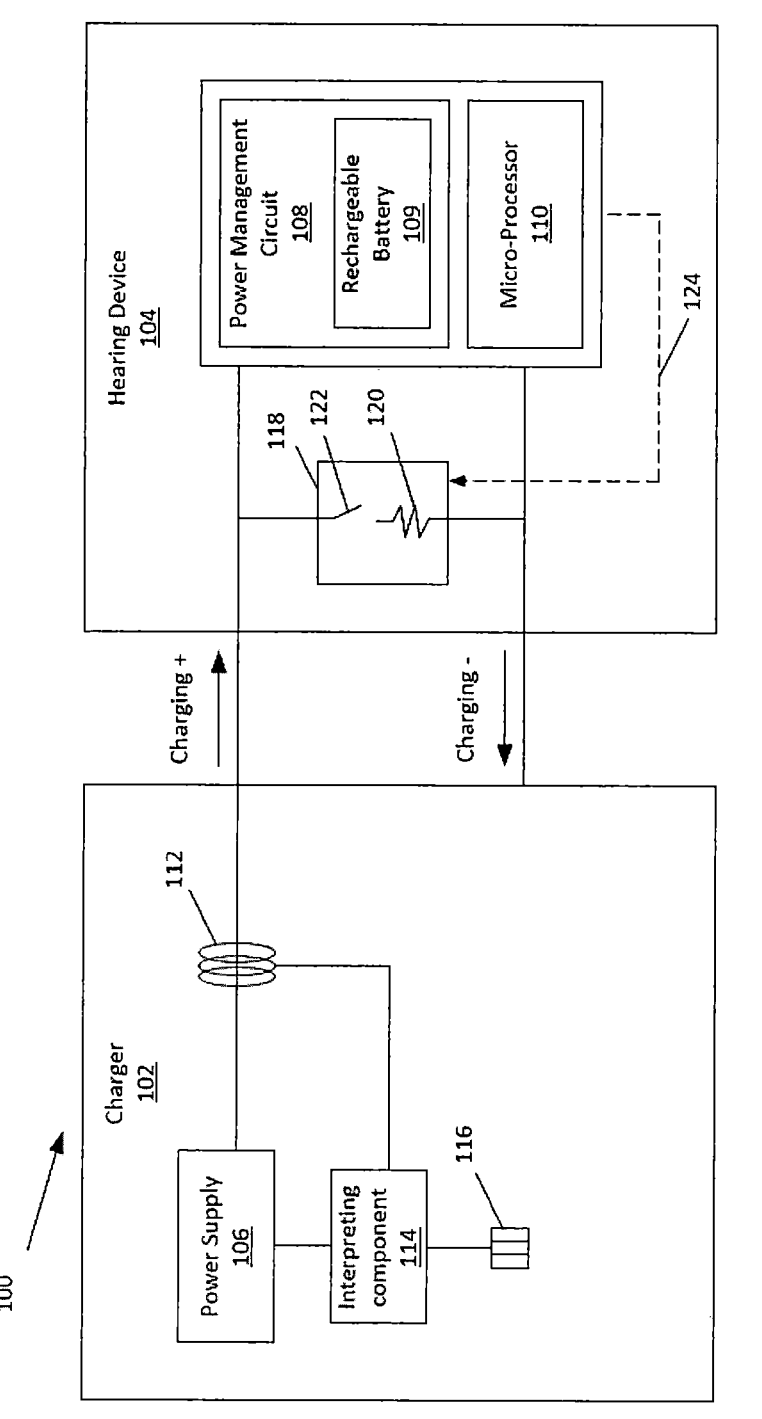
FIG. 1 illustrates an example charging circuit for a hearing device.

FIG. 1 illustrates a circuit diagram of an example embodiment of a charging circuit 100 of a hearing device. The charging circuit 100 is shown by way of example as having two separate components, a charger 102 and a hearing device 104. In the charger 102 of the charging circuit 100 is a power supply which provides a voltage to a power management integrated circuit 108. The power supply can be a variety of suitable AC and DC power supplies known in the art. The power supply can additionally be connected to a current monitor which records an amount of current output by the power supply 106. The charger 102 can additionally have a current monitor 112, which can measure the incoming and/or outgoing current of the charger 102.

The hearing device 104 in FIG. 1 is shown to have a power management circuit 108 and a processor such as a micro-processor 110. The power management circuit 108 may include a rechargeable battery 109 for powering the hearing device 104, charging management circuits, power converters, internal processing and other micro-computing components. The power management circuit 108 controls power to and from the battery 109. The hearing device 104 is also shown to have a micro-processor 110, which can control the function of the hearing device 104, and notably control the function of a bleeding circuit 118. Charging terminals of the charger 102 can be connected to charging terminals (charging+ and charging−) of the hearing device 104 to conduct current between the charger and hearing device. The currents are nominally positive and negative, which can include AC conducted through wires or transmitted wirelessly with coils in place of terminals.

As noted above, the charging circuit additionally can implement a bleeding circuit 118 located in the hearing device 104. In the embodiment shown in FIG. 1, the bleeding circuit 118 is connected in parallel with the power management circuit 108. That is, current is directed away from the power management circuit 108 when the bleeding circuit 118 is enabled. While bleeding circuits are often implemented to safely direct current away from a charging capacitor, a bleeding circuit can also be used for the property of sending pulses back to a charger that monitors a current in order to communicate a message. The bleeding circuit 118 may include, for example, a bleeder resistor 120 and a bleeding circuit switch 122.

Figure 2:
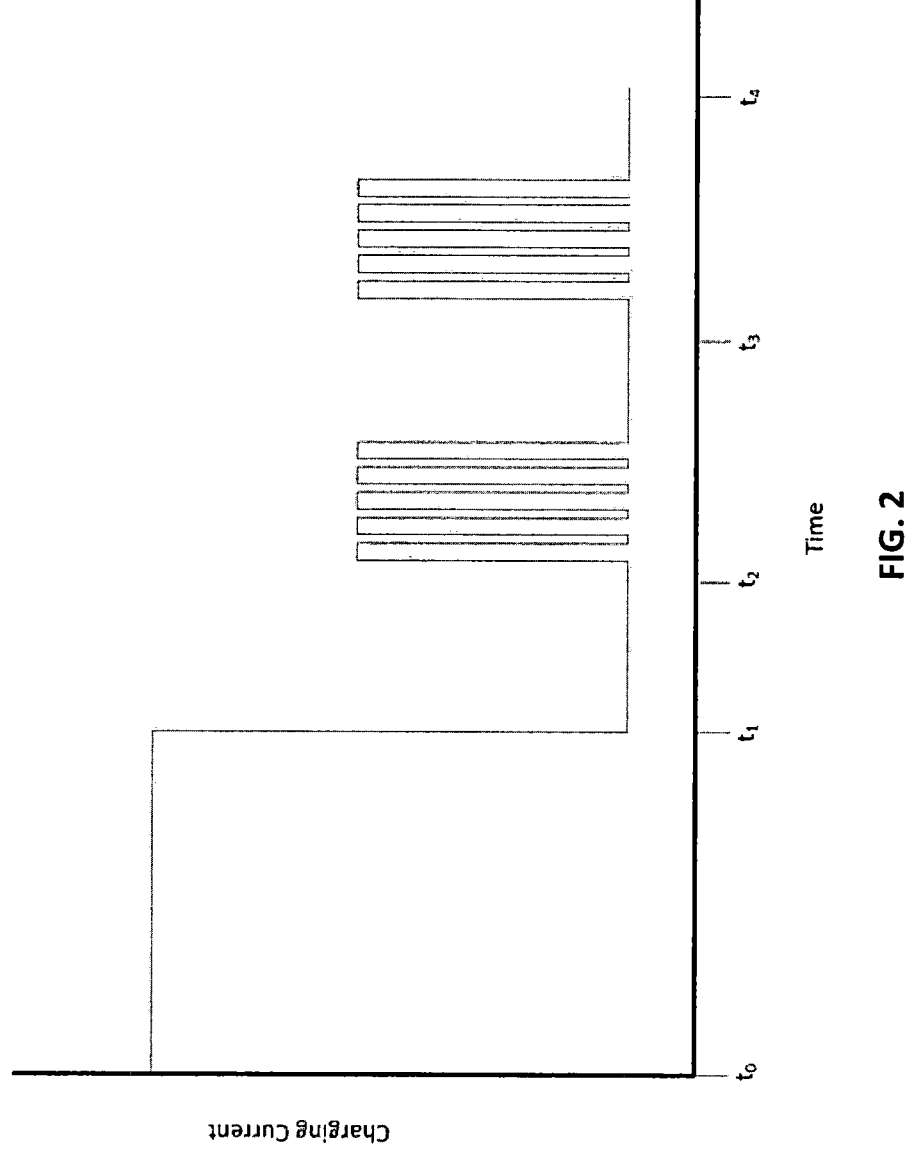
FIG. 2 illustrates a time graph of the charging of a hearing device using a bleeding circuit.
Figure 3:
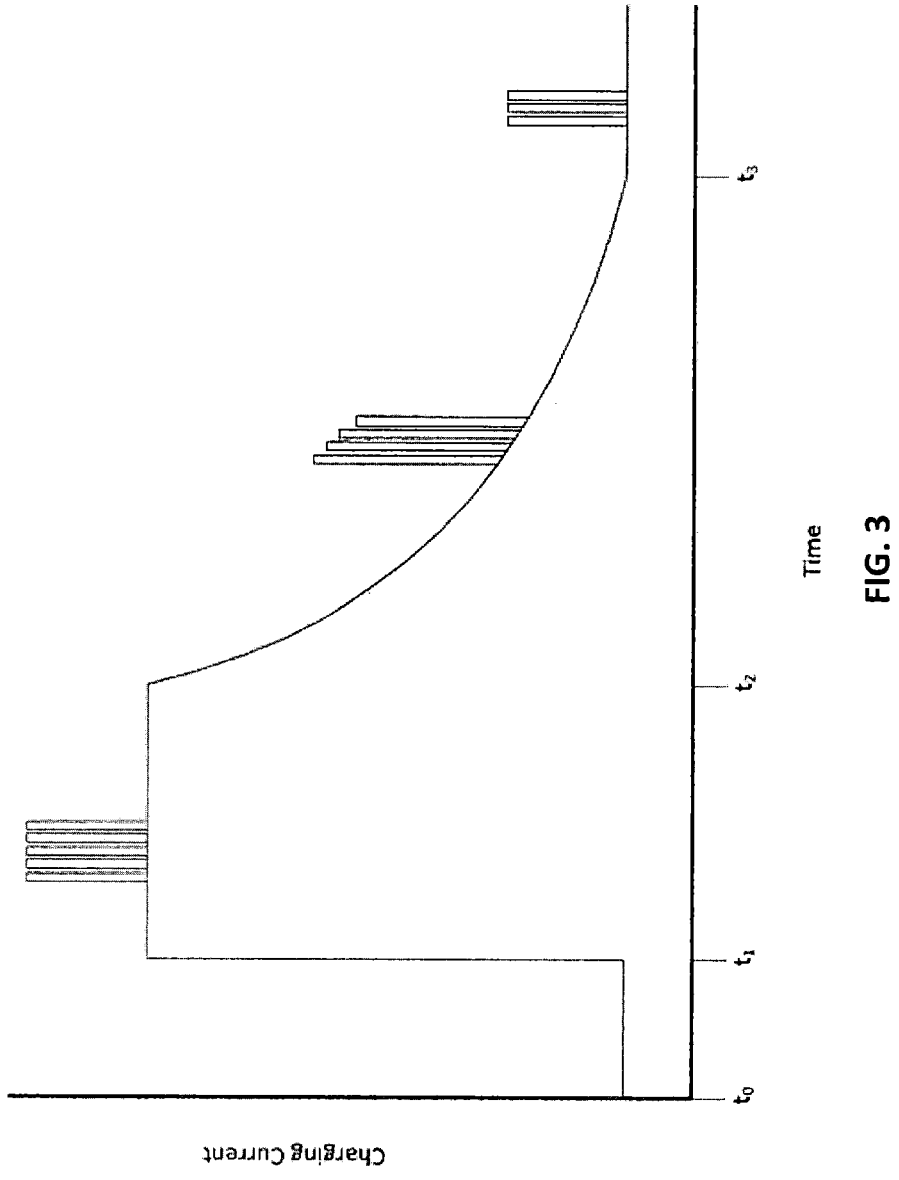
FIG. 3 illustrates a time graph of the charging of a hearing device using a bleeding circuit which emits fixed-voltage pulses.
Figure 4:
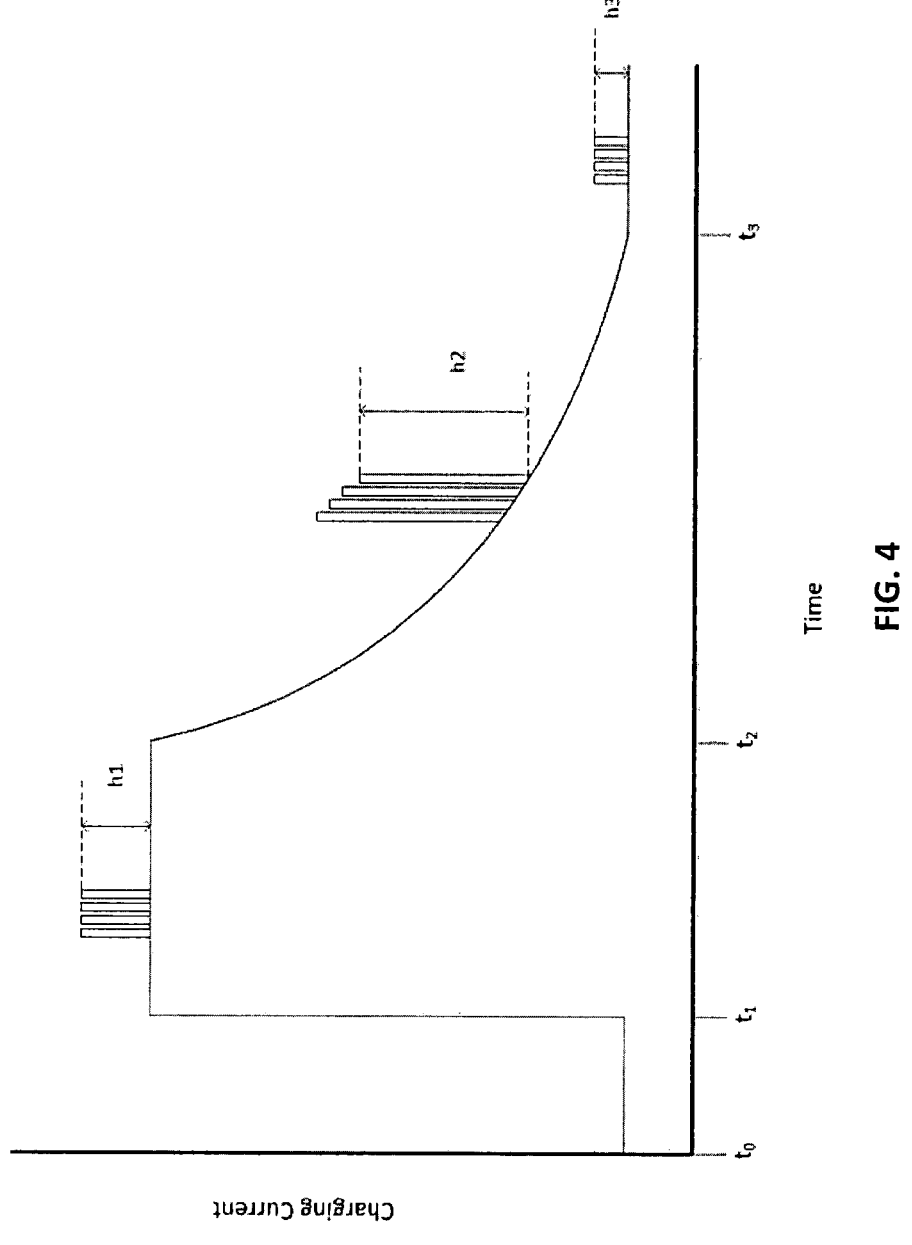
FIG. 4 illustrates a time graph of the charging of a hearing device using a bleeding circuit which emits fixed-interval pulses.

The bleeder resistor 120 directs current away from the power management circuit 108 and the bleeding circuit switch 122 can toggle the bleeder resistor 120 between being enabled and disabled. The enabling and disabling of the bleeder resistor 120 can be controlled by the micro-processor 110 via an enable pin 124. That is, the micro-processor 110 may send an enabling or disabling pin to the bleeding circuit switch 122 which can have the effect of controlling the operation of the bleeder resistor 120. FIGS. 2-4 will provide exemplary conditions for toggling the bleeding circuit switch 122 between enabled and disabled configurations. The battery 109 can be a lithium battery with a voltage of about 3.8 to 4.0 volts during charging. Here, the charger can be an approximately constant voltage source having, for example, a voltage in a range of 4.5 to 6 V. The power management circuit 108 and the bleeding circuit 118 both independently draw a current from the charger. Thus, due to the modulation of the bleeding circuit 118, the charger may detect pulses corresponding to varying levels of current being drawn by the hearing device 104.

In an enabled configuration, the bleeding circuit 118 sends current pulses back to the charger 102. The charger can, via the current monitor 112, monitor the pulses from the bleeding circuit 118. The current monitor 112 can additionally be in communication with a message interpreting component 114. The interpreting component 114 can be, for example, a processor or other non-transitory computer-readable medium contained in the charger. From the monitored current, the interpreting component 114 is able to determine the charging status of the hearing device 104. This may be by way of pre-programming contained in the interpreting component 114 that can analyze qualities of the pulses sent from the bleeding circuit 118, such as time frequency, voltage, amplitude, and the like to determine a battery state of charge (BSOC) of the rechargeable battery 109 within the power management circuit 108. The BSOC may be indicative of a variety of statuses that may be important to a user or the charger, such as battery level, fault, or a completion of charging. The charging device can be configured to control charging of the hearing device based on the messages sent from the bleeding circuit to indicate the status of the of the hearing device. For example, the charging device can be a voltage source configured to control a charging voltage of the hearing device based on a message indicating a battery level, fault, or a completion of charging.

A fault may be any status where charging can become difficult or dangerous, such as having a high battery temperature, low battery voltage below a certain voltage threshold, poor connection between the charger 102 and the hearing device 104, and other situations where charging is impractical. A fault is determined by the micro-processor 110. When a fault is determined, the hearing device 104 may signal that charging should be stopped. When it is detected that a fault mode has ended, the hearing device 104 may signal that charging can resume. It is also contemplated that the bleeding circuit can likewise be used to convey information about other components of the hearing device 104 not discussed throughout the present disclosure. Further, the charger 102 may be controlled by the interpreting component based on the message. Additionally, the interpreting component may be in communication with a BSOC light emitting diode (LED) 116. The BSOC LED 116 is disposed on the charger 102 such that the emitted light is visible to a user. Other types of electrical lighting components may also be suitable for visually indicating a state of the rechargeable battery 109. The light emitted by the BSOC LED 116 may additionally be color-coded to indicate a specific status of the rechargeable battery 109 of the hearing device 104.

Thus, instead of requiring a dedicated communication device to communicate with the charger, the hearing device of the present disclosure implements a bleeding circuit to send pulses conveying information to the charger 102. Example embodiments illustrating how messages can be interpretated will be shown throughout FIGS. 2-4.

FIG. 2 is a time graph of an exemplary charging process implementing the bleeding circuit 118, where time is represented as the x-axis and a charging current is represented as the y-axis. The charging current more particularly represents the output of the power supply 106 measured by the current monitor 112 at the charger 102. From time $t_0$ to $t_1$, the charging management circuit 100 is operating in a normal charging mode and thus, the bleeding circuit 118 is configured to be off, meaning that the switch 122 is currently in a disabling configuration. At time $t_1$, a fault has occurred, the fault being that the charging has stopped. This is recognized by the micro-processor 110 of the hearing device 104, which causes the micro-processor 110 to enable the bleeding circuit 118 to begin toggling at a predetermined rate, delivering pulses in predetermined currents. For example, the current of a pulse from the bleeding circuit may be 5 mA. The current of the emitted pulses may vary between charging modes and between devices where these processes are implemented. It is also contemplated that a relatively wide pulse width should be implemented in sending pulses from the bleeding circuit 118, so to more clearly distinguish from incidental current spikes. For example, a duty cycle of 20 msec may be suitable for the bleeding circuit pulses. As shown in FIG. 2, the bleeding circuit 118 delivers a predetermined number of pulses over a set period of time. In the shown example, from $t_2$ to $t_3$, five pulses of substantially equal current are delivered from the bleeding circuit to the charger 102. The toggling briefly pauses, and the pulses are repeated from $t_3$ to $t_4$. Thus, in the example shown in FIG. 2, a fault is indicated to the charger when five pulses are delivered from the bleeding circuit 118.

FIG. 3 shows another current-time graph depicting an alternative exemplary charging process. In this example, the power management circuit 108 implements both a constant current mode and a constant voltage mode to complete the charging process. Constant current charging charges the battery level of the hearing device more quickly, so the charging process shown in FIG. 3, in which constant current charging is implemented when the rechargeable battery 109 is more empty and implementing constant voltage charging when the rechargeable battery 109 is closer to being full, may be beneficial. In the example shown in FIG. 3, the bleeding circuit may send a predetermined number of pulses to the charger 102 to indicate a specific state of the power management circuit 108. Additionally, the bleeding circuit pulses shown in FIG. 3 can trigger color changes in the BSOC LED 116, which may indicate a specific status of the charging operation.

As shown in FIG. 3, from time $t_0$, where the charging begins to time t1, the charger 102 is in a pre-charging mode. During the pre-charging mode, which may be a time when the charger 102 is first connected to the hearing device 104, the charger 102 safely charges the rechargeable battery 109 of the power management circuit 108 at a rate significantly lower than the charging capacity of the charger 102. From t1 to t2, the power management circuit 108 implements a constant current mode of charging. During this period of time, the bleeding circuit sends a predetermined number of pulses to indicate that the battery charge is still at a low level. In FIG. 3 for example, five pulses of substantially equal current are sent every minute by the bleeding circuit 118 to indicate that the battery charge is still at a low level. Once the pulses begin, the hearing device may have an automatic stop condition based on a predetermined period of time. For example, the pulses may be programmed to automatically stop 10 minutes after starting. It is not necessary that the pulses be equal, or even approximately equal, but in this embodiment of the charging process, the specific levels of current delivered by the pulses from the bleeding circuit 118 are not evaluated by the interpreting component 114, in favor of the number of pulses delivered per minute. Accordingly, the color of the BSOC can be changed, for example, from red to orange, indicating that the rechargeable battery 109 is charging but still at a low level of charge. From $t_2$ to $t_3$, the power management circuit 108 implements a constant voltage mode of charging as the battery is at a higher level. During this time, the bleeding circuit 118 sends four pulses every minute to indicate that the battery of the power management circuit 108 is at a higher level of charge. Accordingly, the color of the BSOC LED 116 is changed from orange to green, indicating that the battery is now at a higher level of charge. At time t3, the battery level of the power management circuit 108 is full, and the charging may stop. From time $t_3$ onward, the bleeding circuit 118 can begin sending three pulses every minute to indicate that the battery is full. Accordingly, the BSOC LED 116 can change from a faint or pulsing green to a solid green, indicating to a user that charging is complete.

Alternatively, as shown in FIG. 4, a message from the hearing device to the charger can be sent via the bleeding circuit 118 by assigning a specific magnitude of current to the pulses to specify the desired message while keeping the number of pulses sent constant. As shown in FIG. 4, during the constant charging mode between times $t_1$ and $t_2$, the bleeding circuit sends four pulses every minute with a first magnitude, represented as h1, indicating that the battery is still at a low level. Between times $t_2$ and $t_3$, a constant voltage charging mode is implemented and the bleeding circuit 118 sends four pulses every minute with a second magnitude, represented as h2, indicating that the battery is at a higher level of charge. Finally, at time $t_3$, the bleeding circuit 118 sends four pulses every minute at a third magnitude, represented as h3, indicating that the battery is full and the charging is thus instructed to stop. As shown in FIGS. 3 and 4, frequency and magnitude of current of the pulses from the bleeding circuit 118 can be adjusted to send pre-programmed messages, but it is also contemplated that different methods of adjusting the operation of the bleeding circuit may be implemented to achieve substantially the same result, such as adjusting duty cycle, amplitude, pulse width and the like.

Figure 5:
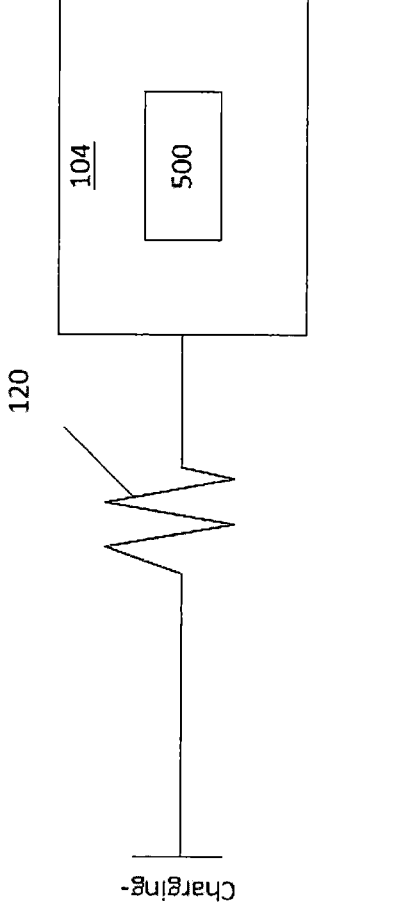
FIG. 5 illustrates an example voltage regulation circuit.

Rather than using a separate switch, pulses may be sent by controlling current through the bleeding circuit via an internal voltage regulator of the hearing device 104. An example configuration of such a voltage regulator is shown in FIG. 5. In FIG. 5, a voltage regulator 500 controls current through the bleeder resistor 120 and the hearing device 104. The voltage regulator 500 may be a low dropout regulator (LDO). Alternatively, it is contemplated that other types of voltage regulators such as step regulators, induction regulators, switching voltage regulators, and the like may be suitable for controlling a voltage output delivered to the hearing device 104.

Figure 6:
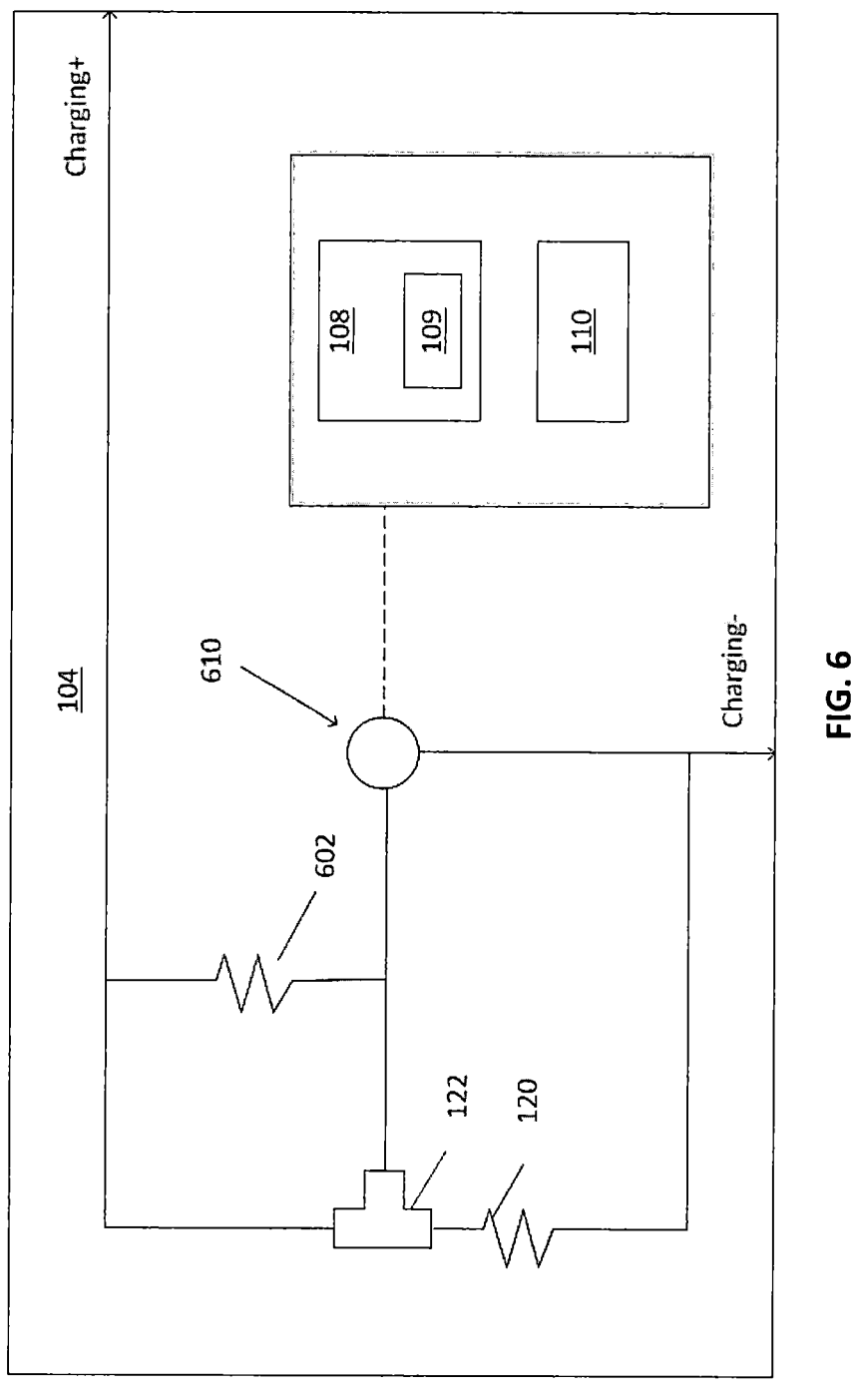
FIG. 6 illustrates an example charging circuit for the charging of a hearing device.

FIG. 6 shows an example implementation of the charging circuit, where a current sink 610 can be activated and deactivated by signals sent from the microprocessor 110 of the hearing device 104. The activation and deactivation of the current sink 610 can control the bleeding switch 122. As shown, the activation and deactivation of the current sink 610 which controls the bleeding circuit switch 122 can be used to toggle the bleeder resistor 120 on and off. The bleeding circuit switch 122, for example, can be a MOSFET transistor. The bleeding circuit may additionally be equipped with a pull-up resistor 602 that can be used to ensure that the transistor 600 is turned off when the current sink 610 is deactivated. The resistance of pull-up resistor 602 can be, for example, 10 kΩ. The resistance of the bleeder resistor 120 can be, for example, 1.33 kΩ. The microprocessor 110 has an I/O device, controlling the operation of the current sink 610, bleeding circuit switch 122 and bleeder resistor 120. Control signals can be sent via a GPIO port. The charging circuit can further include charging terminals (Charging+ and Charging-) as similarly shown in FIG. 1. Thus, the microprocessor 110 can operate the switch 122 via the current sink 610 to force current through the bleeder resistor 120 to send pulses back to the charger to communicate a message as explained with reference to FIG. 1.

Figure 7:
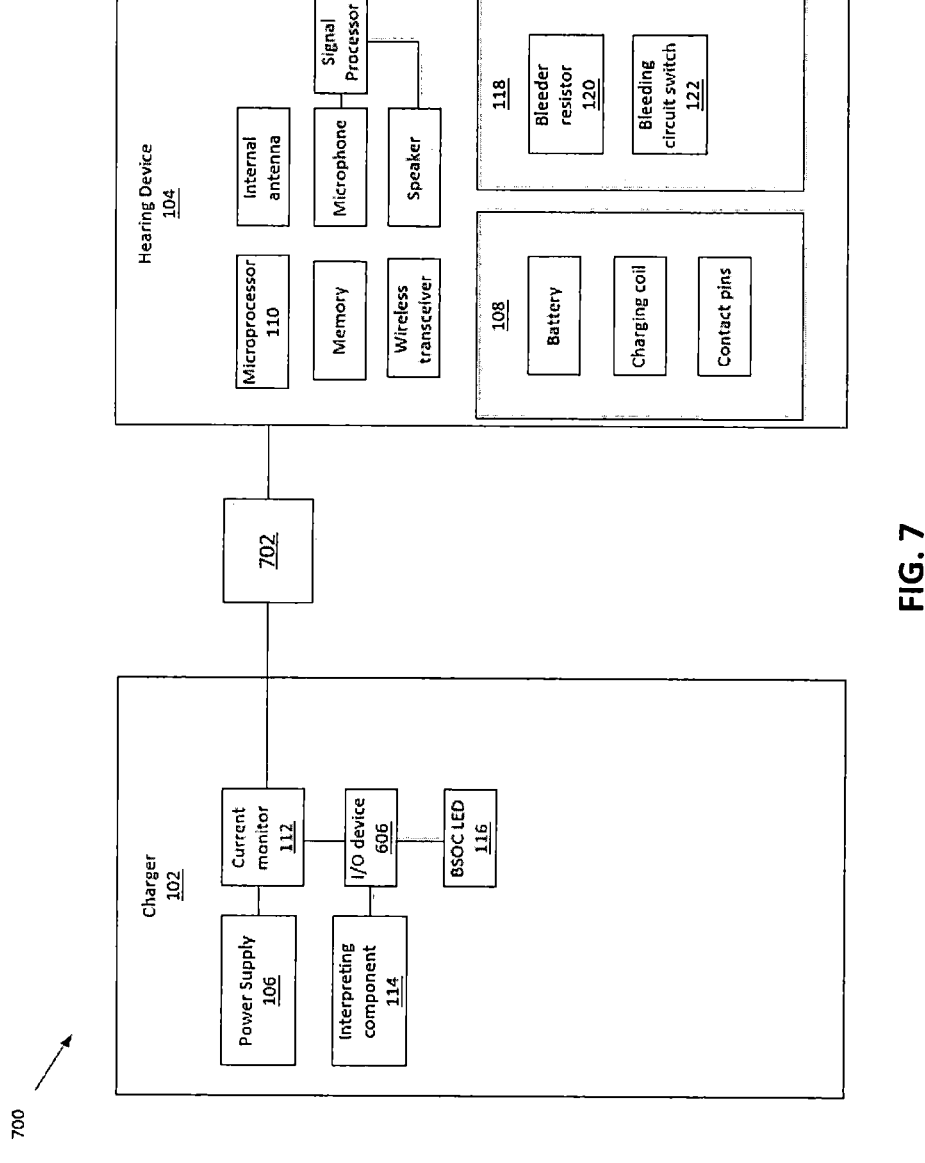
FIG. 7 illustrates a block diagram of an example system for a hearing device and charger according to the present disclosure.

FIG. 7 shows a block diagram illustrating a system of components 700 in or connected to the hearing device and corresponding charging device. The system 700 contains the charger 102 and the hearing device 104, which may be connected by electrical contacts 702. The electrical contacts 702 may be, for example, contact pins, charging coils, and the like. Alternatively, it is contemplated that the charger 102 and the hearing device can be connected, and charge, wirelessly. The charger 102 can have a current monitor 112, which is connected to the power supply 106. The current monitor 112 may monitor the output current from the power supply 106, and also measure current received from the hearing device 104. The current monitor 112 can additionally communicate with an I/O device 606, which contains the interpreting component 114, which may analyze the current monitored by current monitor 112. Additionally, the I/O device can regulate the power output from charger 102 and control the operation of the BSOC LED 116. The hearing device 104 can have internal circuits and computing devices such as, but not limited to the micro-processor 110 that controls the operation of the hearing device 104, a memory, a wireless receiver or transceiver (that picks up wireless signals), a microphone, a speaker (sometimes known as a "receiver"), a signal processor connected to the microphone and a wireless receiver and/or speaker, an internal antenna and the like. As discussed above, the hearing device 104 also houses the power management circuit 108. The power management circuit 108 manages the power stored and supplied to the hearing device 104 and may include a rechargeable battery 109, electrical contacts such as contact pins and/or a charging coil, convertors, power regulation components, and other known power management components in the art.

While various features are presented above, it should be understood that the features may be used singly or in any combination thereof. Further, it should be understood that variations and modifications may occur to those skilled in the art to which the claimed examples pertain.

The invention claimed is:

1. A system for charging a hearing device, comprising:
   a hearing device comprising:
      a battery,
      a charging management circuit configured for charging the battery, and
      a bleeding circuit in parallel with the charging management circuit; and
   a charging device configured to provide electrical power to the hearing device,
   wherein the charging management circuit is further configured to generate a charging current from the electrical power,
   wherein the bleeding circuit is configured to generate bleeding current pulses from the electrical power, wherein the charging device comprises a current monitor configured to detect the bleeding current pulses and to interpret the bleeding current pulses as a hearing device message, and
   wherein the bleeding circuit comprises a resistor in series with a switch, and the bleeding circuit is configured to generate bleeding current pulses by operating the switch to control a current through the resistor.

2. The system for charging a hearing device of claim 1, wherein, based on the hearing device message, the charging device is configured to perform at least one of changing a parameter of the electrical power, presenting a visual indication by a visual indicator on the charging device, or producing an acoustic signal.

3. The system for charging a hearing device of claim 1, wherein the electrical power is provided as a voltage and the charging device and the hearing device are galvanically connected.

4. The system for charging a hearing device of claim 1, wherein
   the electrical power is provided as an alternating electromagnetic field,
   the hearing device comprises a coil to transform the alternating electromagnetic field to an alternating voltage and a rectifier to transform the alternating voltage into a direct voltage, and
   wherein the charging management circuit is configured to generate the charging current from the direct voltage and the bleeding circuit is configured to generate the bleeding current pulses from the direct voltage.

5. The system for charging a hearing device of claim 1, wherein the hearing device message comprises at least one of a state of charge of the battery, a status of the charging management circuit and a fault condition.

6. The system for charging a hearing device of claim 1, wherein the charging device is configured to stop providing electrical power to the hearing device when the hearing device message indicates that a fault has occurred.

7. The system for charging a hearing device of claim 1, wherein the resistor of the bleeding circuit is connected to a voltage output regulator.

8. The system for charging a hearing device of claim 1, wherein the switch of the bleeding circuit is operated by activation and deactivation of a current sink.

9. The system for charging a hearing device of claim 1, wherein the switch of the bleeding circuit is a transistor.

10. The system for charging a hearing device of claim 1, wherein the charging device interprets the hearing device message based on current values of the bleeding current pulses.

11. The system for charging a hearing device of claim 1, wherein the charging device interprets the hearing device message based on a frequency or a count of the bleeding current pulses detected over a period of time.

12. The system for charging a hearing device of claim 1, wherein the charging management circuit is configured to switch between a constant-current charging mode and constant-voltage charging mode.

13. A method for charging a battery of a hearing device, the method comprising:
   providing electrical power from a charging device to a charging management circuit for charging the battery and a bleeding circuit connected in parallel with the charging management circuit, the charging management circuit generating a charging current from the electrical power, and the bleeding circuit generating bleeding current pulses from the electrical power;

detecting the bleeding current pulses; and interpreting the bleeding current pulses, wherein the bleeding circuit comprises a resistor in series with a switch and the bleeding circuit generates bleeding current pulses by operating the switch to control a current through the resistor.

14. The method of claim 13, wherein, based on the hearing device message, performing at least one of changing a parameter of the electrical power, presenting a visual indication by a visual indicator on the charging device, or producing an acoustic signal.

15. The method of claim 13, wherein the method further comprises stopping the charging of the hearing device if the detected electrical pulses indicate that a fault has occurred.

16. A hearing device, comprising:

a charging management circuit configured to receive electrical power from a charging device; and a bleeding circuit in parallel with the charging management circuit and configured to receive the electrical power from the charging device, wherein the charging management circuit is configured to generate a charging current from the electrical power to charge a battery of the hearing device, wherein the bleeding circuit is configured to generate bleeding current pulses from the electrical power and send the bleeding current pulses to a current monitor of the charging device configured to detect the bleeding current pulses and to interpret the bleeding current pulses as a hearing device message, and wherein the bleeding circuit comprises a resistor in series with a switch, and the bleeding circuit is configured to generate bleeding current pulses by operating the switch to control a current through the resistor.

17. The hearing device of claim 16, wherein the hearing device message comprises at least one of a state of charge of the battery, a status of the charging management circuit and a fault condition.

* * * * *